United States Patent [19]

Bennett et al.

[11] Patent Number: 4,660,760
[45] Date of Patent: Apr. 28, 1987

[54] THERMODYNAMIC STEAM TRAP VALVE DISCS

[75] Inventors: Alan F. Bennett, Cossington; Roy J. Gooderham, Cheltenham, both of England

[73] Assignee: Spirax Sarco Limited, Cheltenham, England

[21] Appl. No.: 768,088

[22] Filed: Aug. 21, 1985

[30] Foreign Application Priority Data

Aug. 29, 1984 [GB] United Kingdom ................. 8421856

[51] Int. Cl.⁴ ................................................ F16T 1/04
[52] U.S. Cl. ........................................ 236/59; 137/183
[58] Field of Search ............... 236/59, 54, 53, 48 R, 236/101 E; 137/183, 512.2, 630.15, 854; 251/38

[56] References Cited

U.S. PATENT DOCUMENTS

| 1,880,204 | 10/1932 | Kaye | 236/59 X |
| 2,462,189 | 2/1949 | Hess | 137/854 X |
| 2,487,620 | 11/1949 | Waller | 236/48 R |
| 2,746,685 | 5/1956 | Myers | 236/53 |
| 3,467,309 | 9/1969 | Fujiwara | 236/59 |
| 3,720,233 | 3/1973 | Goellner | 137/183 |
| 3,724,751 | 4/1973 | Fujiwara | 236/59 |
| 3,790,076 | 2/1974 | Wichtel | 236/54 |
| 3,791,578 | 2/1974 | Brand et al. | 236/54 |

FOREIGN PATENT DOCUMENTS 961765  6/1964  United Kingdom ................. 236/59

Primary Examiner—William E. Wayner
Attorney, Agent, or Firm—Armstrong, Nikaido, Marmelstein & Kubovcik

[57] ABSTRACT

A disc valve member (5) is disclosed that can be fitted to a thermodynamic steam trap (1) without modification of the trap. The disc valve member has an internal chamber (7) and perforated portions (8,9) through which air can escape from a chamber (6) in which the disc valve member floats when fitted in a trap, it being desirable that such air escape should be possible during start-up conditions in a steam line. At normal operating temperature, a bi-metal disc (10) within the internal chamber (7) of the disc valve member is snapped-over to a position in which the path for air escape from the trap chamber (6) is closed, and the disc valve member operates as an imperforate member.

6 Claims, 3 Drawing Figures

THERMODYNAMIC STEAM TRAP VALVE DISCS

FIELD OF THE INVENTION

This invention relates to valve discs of thermodynamic steam traps.

BACKGROUND OF THE INVENTION

The main function of a steam trap is to drain condensate from a steam line in which the trap is connected, but it is desirable also to discharge air and other non-condensible gases which may collect in the steam line. For example, when steam is first turned on to cold plant there is usually a considerable volume of air which should be purged out as quickly as possible so as quickly to raise the plant to operating temperature.

In a thermodynamic steam trap there is a floating disc that serves as a valve member, mating with concentric seat rings below the disc to control communication between an inlet to the trap and a discharge outlet from the trap. When steam is first turned on, the disc is raised by the pressure and air in the line is discharged. Following condensate, which is cold at first, is also discharged. As the condensate temperature and pressure rise, flash steam is formed under the disc and the velocity of this passing below the disc towards the outlet increases, lowering the pressure under the disc so that the disc is drawn towards the seat rings. At the extreme circumference of the disc the velocity is less and there is a pressure build-up in a chamber above the disc until, at a point when the condensate temperature has approached that of steam, the flash-produced pressure in the chamber above the disc, acting on the large overall area of the disc, overcomes the inlet pressure (which acts on a smaller area of the disc) and the disc snaps shut against the seat rings to prevent further flow. Deprived of further flash steam, the pressure in the chamber above the disc falls, the inlet pressure asserts itself and the valve opens for the cycle to be repeated. However, if considerable amounts of air are encountered, so-called "air-binding" may occur, that is the trap may become held closed for long periods by air caught in the chamber above the disc. This phenomenon is discussed in some detail in British Patent Specification No. 1,178,160.

PRIOR ART

In a thermodynamic steam trap described and claimed in Specification No. 1,178,160 there is a bi-metal ring, which either expands or contracts on cooling, co-operating with an inclined surface such that the ring is displaced to lift the disc valve member off its seat arrangement on cooling of the bi-metal ring below a certain temperature, thereby to over-ride the effect of air trapped in the chamber above the disc. It will be appreciated that the steam trap has to be provided with the inclined surface, and there has to be sufficient space to accommodate the bi-metal ring. In use, because the bi-metal ring has to slide up and down the inclined surface, there is a danger that it will stick in one or other of its extreme positions.

Another approach to the problem of air-binding is radially to groove the sealing face of the disc to provide an air-bleed from the chamber above the disc. The problem then arises that controlling steam can also bleed away and additional measures have to be taken to deal with this.

SUMMARY OF THE INVENTION

According to the present invention, there is provided a disc valve member on a thermodynamic steam trap, the disc valve member having an internal chamber and perforated portions through which fluid flow can take place from one side of the disc valve member to the other, there being within the internal chamber a temperature-responsive member which can adopt a condition in which it co-operates with one of the perforated portions to prevent such fluid flow. The disc valve member can have the same external dimensions as a conventional thermodynamic steam trap disc valve member so that it can be fitted in place of a conventional disc valve member without any alteration to the remainder of the trap. Without recourse to any modifying of the trap, there is obtained an arrangement in which an air bleed is available when required as discussed above, with the additional advantage that a positive cut-off of the bleed is also available, achieved when the temperature-responsive member adopts the position in which it prevents fluid flow from one side of the disc valve member to the other, the disc valve member now acting as an imperforate member.

For a better understanding of the invention and to show how the same may be carried into effect, reference will now be made, by way of example, to the accompanying drawings, in which:

DETAILED DESCRIPTION OF THE DRAWING

DETAILED DESCRIPTION OF THE INVENTION

Figure 1:
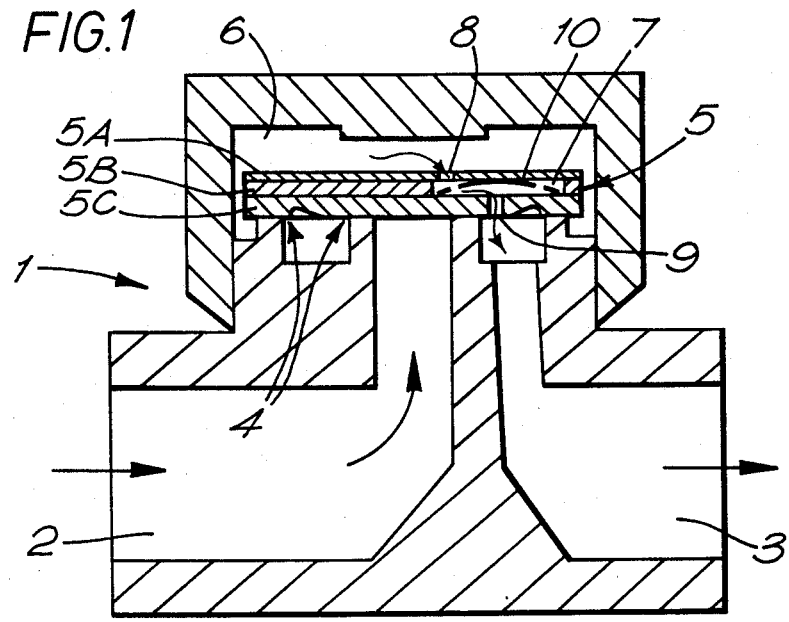
FIG. 1 is a schematic sectional side view of a thermodynamic steam trap.

The thermodynamic steam trap 1 shown in the Figures has an inlet 2 communicating with a discharge outlet 3 via an inner and outer seat ring arrangement 4 which may be concentric as shown. A floating disc 5 serves as a valve member that co-operates with the seat ring arrangement 4 to control communication between the inlet 2 and the outlet 3. The disc 5 floats within a chamber 6. Except that the disc 5 is not a simple imperforate disc (as will be described herinafter), the trap 1 is of conventional construction and operates in accordance with the principles described above.

The disc 5 fitted in the present trap is of sandwich construction, having three layers 5A, 5B and 5C that are welded together around the periphery of the disc. The intermediate layer 5B is apertured so that an internal chamber 7 is defined in the disc. Bores 8 and 9 in the outer layers 5A and 5C define perforated portions of the disc through which fluid flow can take place from one side of the disc to the other via the internal chamber 7 in the disc.

Within the internal chamber 7 there is a temperature-responsive member that is a bi-metal disc 10 having perforations 11 near its periphery, and an imperforate central portion.

Figure 2:
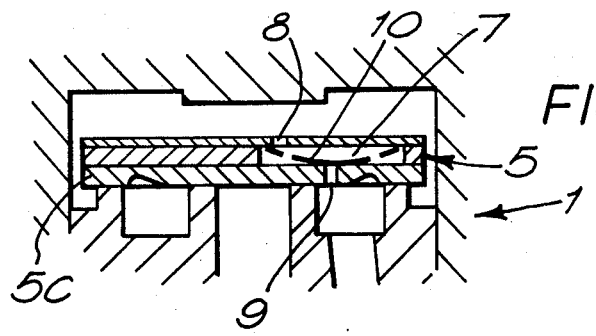
FIG. 2 is a schematic sectional side view of part of the trap of FIG. 1, shown in a different operation condition.
Figure 3:
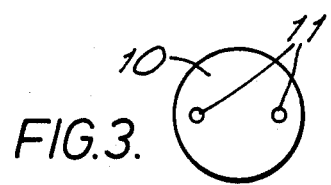
FIG. 3 is a plan view of a component of the trap of FIGS. 1 and 2.

When the trap 1 is cold the bi-metal disc 10 adopts the position shown in FIG. 1. The bi-metal disc is clear of each of the bores 8 and 9 so that fluid flow can take place from the chamber 6 in which the disc floats to the discharge outlet 3. In this condition, the trap can operate in conventional fashion, that is as described above, but with the provision that any air caught in the chamber 6 can escape via the bore 8, the perforations 11 and the bore 9, as shown by a chain-dot arrow in FIG. 1. In particular, if the disc is drawn onto its seat arrangement 4 during plant start-up, it immediately lifts again and discharge of cold condensate and non-condensibles continues. However, as normal operating temperature is approached, the bi-metal disc 10 snaps over to the position shown in FIG. 2, in which the central imperforate portion of the disc 10 seats upon the bore 9 in the disc layer 5C to close the path 8/7/9. The trap then continues to operate as if the disc 5 were imperforate.

It will be appreciated that the disc 5 can be of the same external dimensions as a conventional imperforate disc, and no alteration to the remainder of the trap 1 is necessary to accommodate the disc 5. Thus the disc 5 can be fitted, as a replacement disc valve member, to an existing trap.

What is claimed is:

1. In a thermodynamic steam trap having an inlet, an outlet, a chamber between the inlet and the outlet, an inner and outer seat arrangement through which the inlet can communicate with the outlet via the chamber, and a disc valve member disposed in the chamber and cooperating with the seat arrangement to control communication between the inlet and the outlet, the improvement comprising, the disc valve member having an internal chamber and perforated portions through which fluid flow can take place from one side of the disc valve member to the other via the internal chamber, there being entirely, within the internal chamber a temperature-responsive member which can adopt a condition in which it co-operates with one of the perforated portions to prevent such fluid flow.

2. A steam trap as claimed in claim 1, wherein the disc valve member is of layered construction, an intermediate layer being apertured to define with adjacent layers on each side said internal chamber.

3. A steam trap as claimed in claim 2, wherein the layers of the disc valve member are welded together around the periphery of the disc valve member.

4. A steam trap as claimed in claim 1, 2 or 3, wherein the temperature-responsive member is a disc that is perforated outboard of an imperforate central portion, this imperforate central portion co-operating with said one of the perforated portions of the disc valve member when the temperature-responsive member adopts said condition.

5. A steam trap as claimed in any one of claims 1, 2, or 3, wherein the temperature-responsive member is a bi-metal member.

6. A steam trap as claimed in claim 1, wherein the temperature-responsive member is a thin bi-metal member having an imperforated portion which cooperates with one of the perforated portions of the disc valve member when the bi-metal member adopts said condition.

* * * * *